United States Patent
Clark

Patent Number: 5,983,430
Date of Patent: Nov. 16, 1999

[54] WELDING SLAG HAMMER AND REAMER

[76] Inventor: Tim C. Clark, c/o Dr. Ron Dorchuck, 29100 Santiam Ter., Lebanon, Oreg. 97355

[21] Appl. No.: 09/096,546

[22] Filed: Jun. 12, 1998

Related U.S. Application Data

[60] Provisional application No. 60/049,494, Jun. 12, 1997.

[51] Int. Cl.[6] .................................................. B25D 1/04
[52] U.S. Cl. .................................... 7/144; 7/146; 7/158
[58] Field of Search ............................ 7/143, 144, 146, 7/147, 157, 158; 81/20

[56] References Cited

U.S. PATENT DOCUMENTS

| | | | |
|---|---|---|---|
| 209,803 | 11/1878 | Dyson | 7/147 |
| 3,821,824 | 7/1974 | Pilcher | 7/143 |

*Primary Examiner*—James G. Smith
*Attorney, Agent, or Firm*—Ken J. Pedersen; Barbara S. Pedersen

[57] ABSTRACT

The invention is a combination welder's slag hammer and reamer. The slag hammer part of the combination tool may be of conventional design, that is, a handle, a shaft connected to and extending from the handle on one end of the shaft, a head connected to the other end of the shaft, the head having a sharpened blade on one end for knocking off the weld spatter. The reamer part of the combination tool may be anywhere on the hammer. Preferably, the reamer is on the head, at the opposite end from the blade. This way, the hammer handle may be simply rotated to use the blade end or the reamer end. Generally, the reamer is of cylindrical construction so that it easily fits inside the nozzle. Preferably, the reamer is tapered from smaller to larger from the end to the middle of the hammer head. This way, nozzles of different diameters may be cleaned by the same reamer. The reamer has facets or edges on its surface for scraping the weld spatter off the inside of the nozzle. The facets or edges may be of any reasonable number, and may be made in any conventional manner, for example, by grinding grooves in the surface of the reamer end to expose the facets as the edges of the grooves, or by forging the facets in with a press while the metal is hot.

4 Claims, 3 Drawing Sheets

←—60

←—70

←—80

←—90

WELDING SLAG HAMMER AND REAMER

DESCRIPTION

This application is a conversion from a prior co-pending provisional application Ser. No. 60/049,494, filed Jun. 12, 1997 and entitled "Welding Slag Hammer and Reamer."

BACKGROUND OF THE INVENTION

1. Field of the Invention.

This invention relates generally to welding, and more particularly to a welding slag hammer which also incorporates a reamer on the hammer. The reamer is used to conveniently clean welding spatter from the inside of a gas-shroud type welding nozzle. This way, the welder has conveniently available in one tool both the slag hammer and the reamer.

2. Related Art.

Welders have used slag hammers to remove weld drip and spatter from pieces being welded. Typically, the slag hammer has a handle which is connected to a shaft which is connected to a head. The head has an end which is flattened and sharpened to be like an ax or chisel blade. The welder uses the slag hammer by grasping the handle and swinging the hammer so that the blade strikes the weld spatter and knocks it off the piece being welded.

Welders have also used gas-shrouded welding nozzles. In gas-shrouded welding, an inert gas, such as argon, for example, is flowed through a cylindrical, hollow nozzle. The nozzle also has the welding rod centered in it, the rod extending out slightly from the nozzle in order to be able to contact the piece to be welded. This way, a blanket of inert gas is laid down around the tip of the welding rod where it contacts the piece to be welded, shielding the weld point from the air, and from undue combustion and oxidation.

Often, weld spatter enters the inside of the gas shroud nozzle, tending to plug it. Then, the welder must remove the welding rod from the nozzle in order to clean the nozzle. Often, the cleaning has been done with a chisel or a long nail or other sharp tool which can be inserted inside the nozzle. If the cleaning tool is not of a size appropriate for the inside of the nozzle, the nozzle may be damaged by the cleaning operation. Also, if the cleaning tool is not conveniently available to the welder, the welder may delay, or fail, to clean the nozzle, resulting in plugged nozzles and welding down-time. Therefore, there is still a need for a convenient and effective reamer for a gas shroud welding nozzle.

SUMMARY OF THE INVENTION

The invention is a combination welder's slag hammer and reamer. The slag hammer part of the combination tool may be of conventional design, that is, a handle, a shaft connected to and extending from the handle on one end of the shaft, and a head connected to the other end of the shaft, the head having a sharpened blade on one end for knocking off the weld spatter.

The reamer part of the combination tool may be located anywhere on the hammer. Preferably, the reamer is on the head, at the opposite end from the blade. This way, the hammer handle may be simply rotated one direction to use the blade end or the other direction to use the reamer end.

Generally, the reamer is of cylindrical construction so that it easily fits inside the nozzle. Preferably, the reamer is tapered from smaller to larger from the distal end to the middle of the hammer head. This way, nozzles of different diameters may be cleaned using the same reamer.

The reamer has facets or edges or faceted edges on its surface for scraping the weld spatter off the inside of the nozzle. The faceted edges may be of any reasonable number, and may be made in any conventional manner, for example, by grinding grooves in the surface of the reamer end to expose the facets as the edges of the grooves, or by forging the facets in with a press while the metal is hot.

DESCRIPTION OF THE PREFERRED EMBODIMENTS

Figure 1:
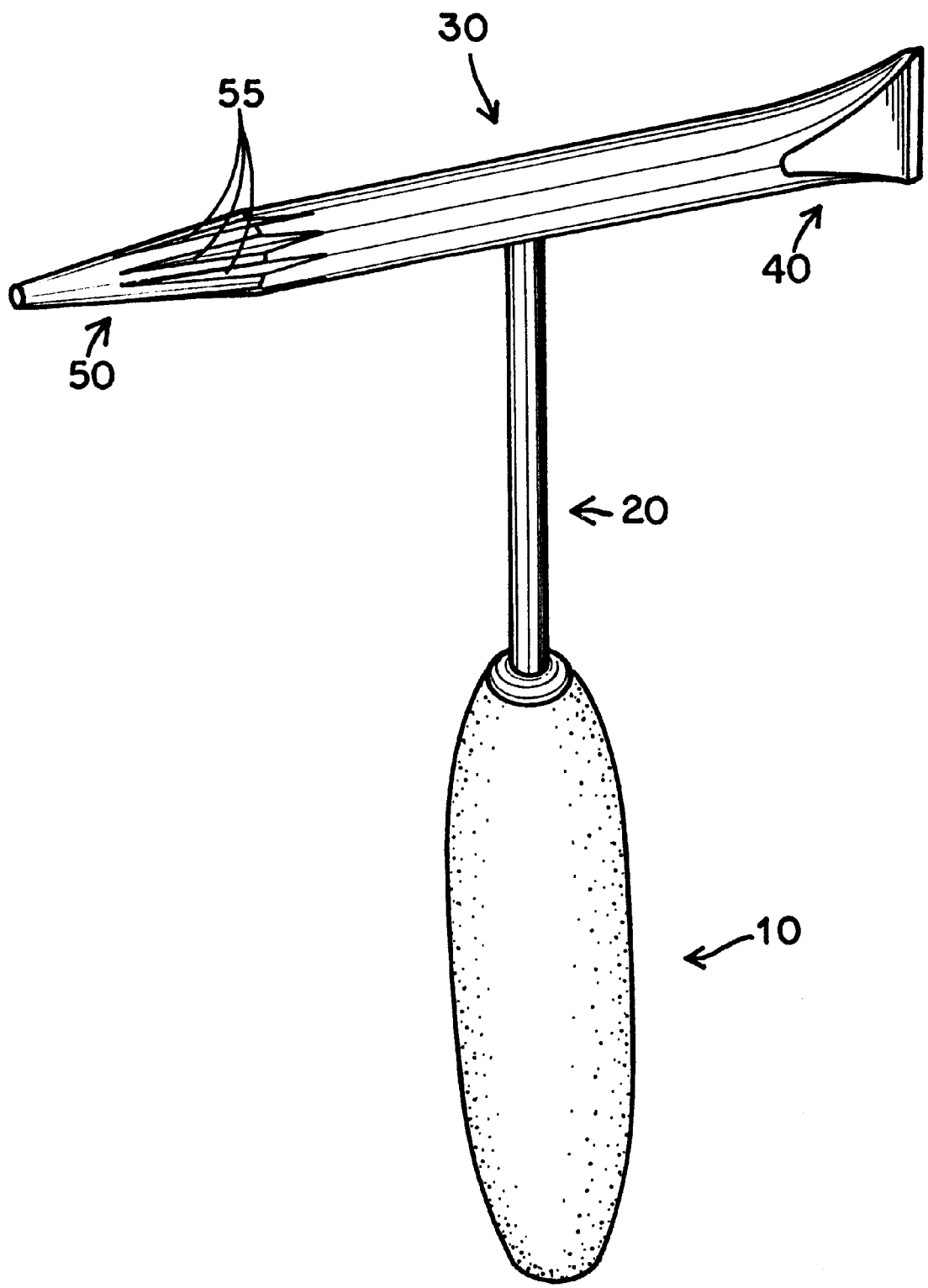
FIG. 1 is a side, perspective view of one embodiment of the invention.
Figure 2A:
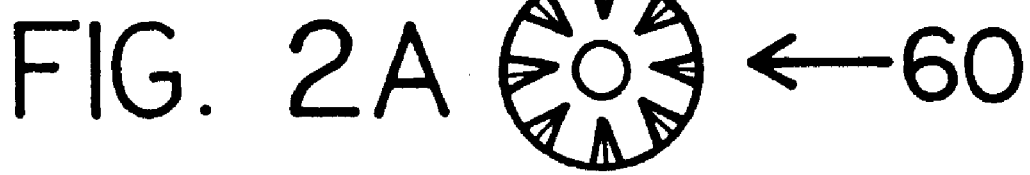
FIGS. 2-A, 2-B, 2-C and 2-D are partial, reamer-end views of 4 (four) different embodiments of the invention, with 8, 6, 4 and 3 sets of facets or edges, respectively.
Figure 2B:
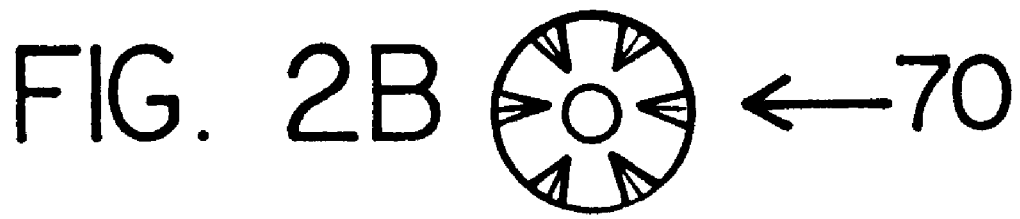
Figure 2C:
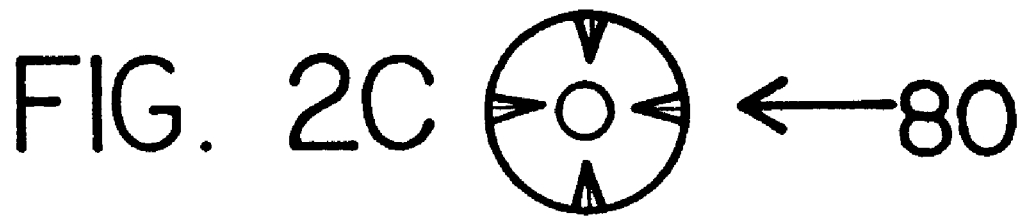
Figure 2D:
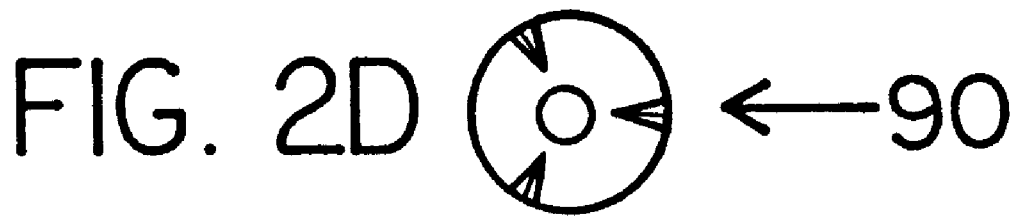

FIG. 1 displays a side, perspective view of one embodiment of the invention, which combines the conventional tools of welders' slag hammer and a reamer. The welding slag hammer and reamer assembly embodiment here is a slag hammer, the design of which is conventional, with a handle 10, a shaft 20 connected to and extending from the handle 10 on one end and a head 30 connected at the opposite end. The head 30 has a sharpened blade 40 on one end for knocking off weld spatter.

In FIG. 1, the reamer 50 is situated at the opposite end of the hammer head 30 from the blade 40. The reamer 50 could be situated elsewhere on the hammer, but this position is preferable and logical because the hammer handle 10 could simply be rotated in order to use the reamer 50 or, alternatively, the blade 40. The reamer 50 is cylindrical and tapered from a smaller diameter at the distal end of the head 30 to a larger diameter as it approaches the middle of the head 30. Thus, nozzles of varying diameters can be cleaned by one reamer. In the preferred embodiment, the reamer is longitudinally engraved with faceted edges 55.

FIG. 2 shows reamer-end views of various faceting possibilities, shown as FIGS. 2-A, 2-B, 2-C and 2-D. Facet example 60, as shown in FIG. 2-A, has eight sets of faceted edges. Similarly, facet example 70 (FIG. 2-B) has six sets; facet example 80 (FIG. 2-C) has four sets, and facet example 90 (FIG. 2-D) has three sets. In each of these examples, the faceted edges serve as scrapers as the reamer is pushed into and twisted within a nozzle. The facets can be produced in various manners, as convenient; for example, by grinding grooves in the surface of the reamer end to expose the facets as the edges of the grooves, or by forging the facets in with a press while the metal is hot.

Figure 3:
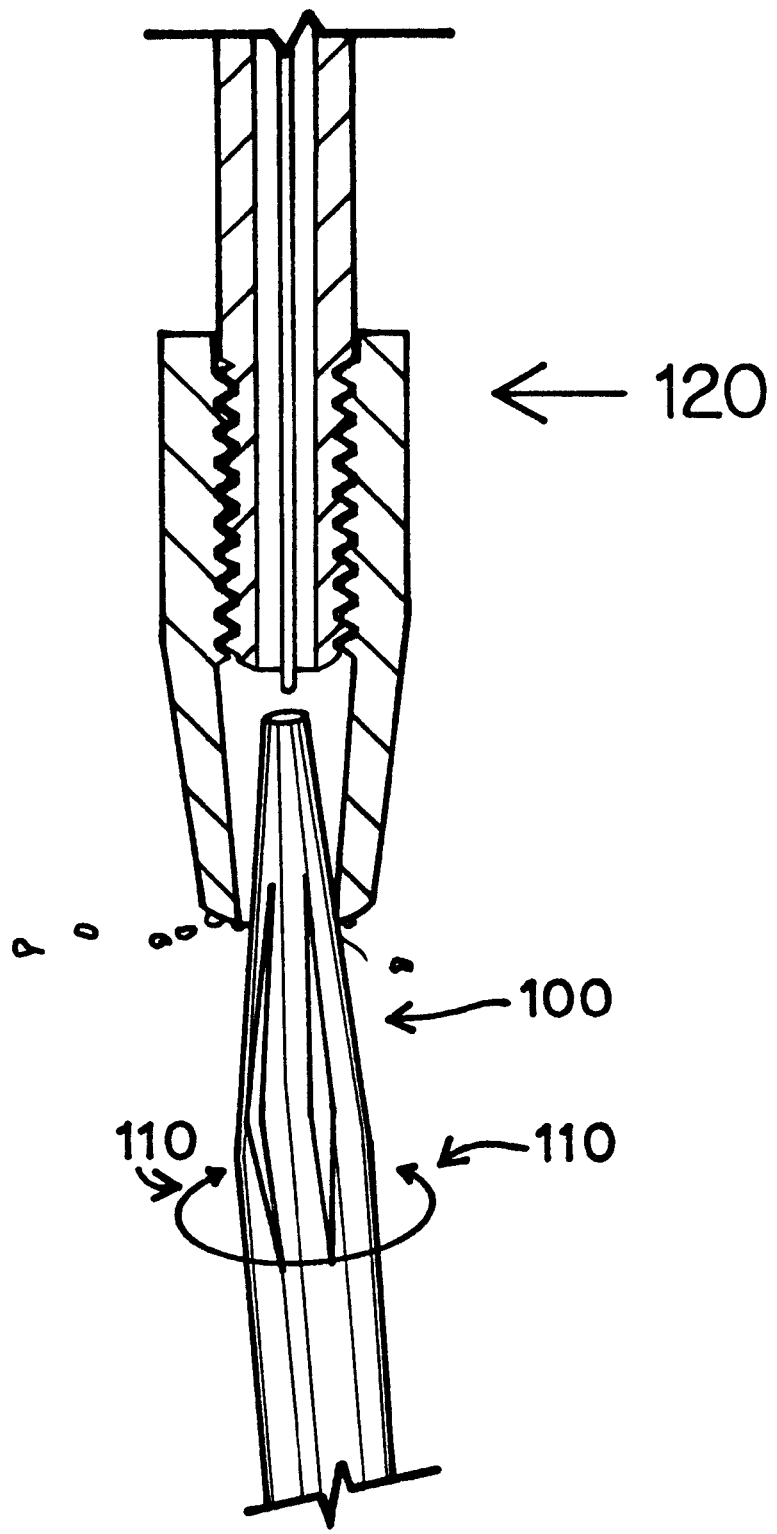
FIG. 3 is a partial, cross-sectional view of one embodiment of the reamer end of the combination tool being used to clean a nozzle.

FIG. 3 demonstrates, by means of a partial cross-sectional view, the reamer end 100 of the combination tool being used in a circular twisting motion as depicted by the arrows 110 inside a nozzle 120.

Although this invention has been described above with reference to particular means, materials and embodiments, it is to be understood that the invention is not limited to these disclosed particulars, but extends instead to all equivalents within the scope of the following claims.

I claim:

1. A welding slag hammer and reamer assembly comprising:
   a hammer handle;
   a shaft connected to and extending from said hammer handle;
   a head connected perpendicular to said shaft opposite said hammer handle;
   a sharpened blade located on one distal end of said head for knocking off weld spatter; and,
   a reamer located on said hammer for removal of weld spatter from the inside of a welder nozzle.

2. A welding slag hammer and reamer assembly as in claim 1, wherein said reamer is located on said head opposite said sharpened blade.

3. A welding slag hammer and reamer assembly as in claim 2, wherein said reamer is cylindrical and tapered from a smaller diameter at the distal end of said head to a larger diameter near the middle of said head.

4. A welding slag hammer and reamer assembly as in claim 1, wherein said reamer has longitudinal faceted edges for scraping weld spatter from the inside of a welding nozzle.

* * * * *